United States Patent Office.

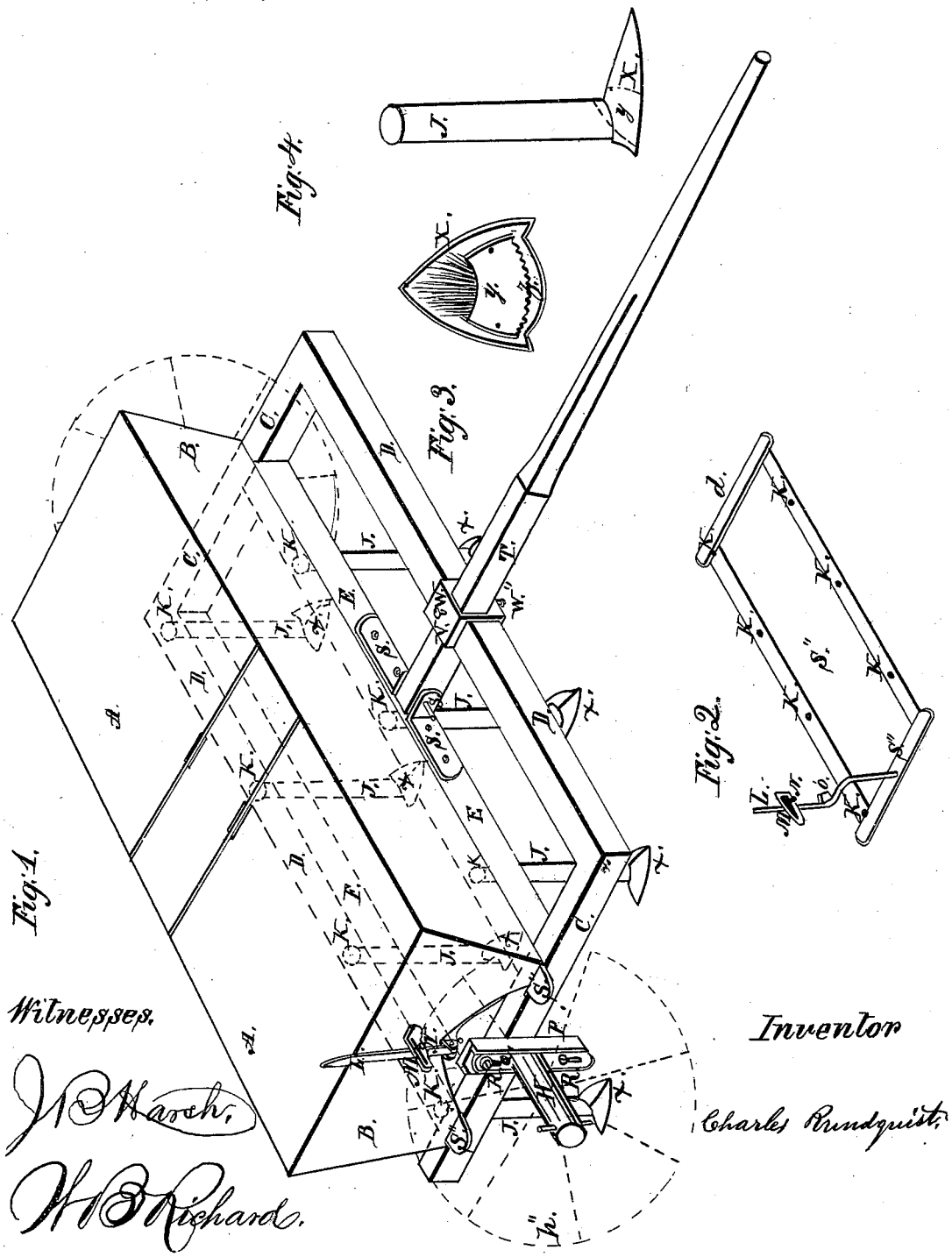

CHARLES RUNDQUIST, OF MANKATO, MINNESOTA.

Letters Patent No. 87,115, dated February 23, 1869.

IMPROVEMENT IN ADJUSTABLE SEEDER.

The Schedule referred to in these Letters Patent and making part of the same.

*To all whom it may concern:*

Be it known that I, CHARLES RUNDQUIST, of Mankato, Minnesota, have invented a new and useful "Adjustable-Depth Seed-Sower;" and I do hereby declare that the following is a full, clear, and exact description thereof, which will enable others skilled in the art to make and use the same, reference being had to the accompanying drawings, forming part of this specification.

This invention relates to a new and improved broadcast seed-sower, for placing all the seed at the same or a uniform depth; and The invention consists, mainly, in the peculiar shape of the shovels, or teeth, whereby the seed may be all placed at the same depth and covered.

It also consists in the device for adjusting the depth, and in the device for delivering the seed to the spouts.

Figure 1 is a perspective view of the machine.

Figure 2 is a view of the feeding-device.

Figure 3 is a sectional view of the bottom of one of the shovels, or teeth.

Figure 4 is a vertical central sectional view of one of the shovels, and the pipe, or tube leading to the same.

Similar letters of reference indicate corresponding parts.

C D F, fig. 1, represent a rectangular frame, in connection with cross-piece E.

K, fig. 1, represents the holes in the cross-pieces E and F, through which the tubes pass up, for receiving the seed. These holes are so situated, that the ones in the rear frame-piece F alternate with those in the forward piece E.

S", fig. 2, represents a rectangular slide, formed to fit over the pieces F and E, and with holes corresponding with the holes in the pieces E and F.

L M N O represent the device for operating the slide S".

L is a lever, pivoted to the hopper at $o$, and connected to slide S", as seen at fig. 2.

M is a guard, with a slot and thumb-screw, N, by means of which the lever may be set at any desired point, and held securely until changed.

By means of this lever, the holes in the slide S" may be brought exactly over the holes in the pieces E and F; and, being left at that point, the greatest maximum flow of seed is obtained; or, the lever may be set so as to nearly close the holes K, and thereby produce any desired degree of less rapid flow of seed; or the holes may be closed entirely when necessary.

$h''$, fig. 1, are the wheels, and

H, the spindles, only one of which is seen.

This spindle is attached to and forms part of the piece Q, which piece Q slides freely in the groove, in the piece P, which piece P is bolted on to the side of the main frame.

R R are set-screws, by means of which the piece Q may be held at any desired height, and by means of which the height of the main frame from the ground may be regulated, thereby governing the depth at which the seed may be sown.

J, in the drawings, represents the tube leading from the openings K, down to the shovels, or teeth X.

Fig. 3 represents the bottom of one of these shovels.

Y, fig. 3, is a piece fastened in the lower part of the shovel X, and closing the same, all except a curved opening across the rear part, shown by the zigzag line Z.

Z, fig. 3, is the rear side of the plate Y, and extends upward in the shoe X, as shown at fig. 4, by the dotted line $y$.

The rear side of plate Y is cut in a series of grooves, running from the apex to the base, and spreading, toward the base, in a manner to spread the grain, descending, evenly and regularly, the width of the shoe X.

The shape of these shoes X is shown at fig. 1. In front, they are a point, and broaden rapidly as they extend back, until they are much wider than the tube J. At the same time, they rise slightly toward the rear. This shape, it will be seen permits them to slide easily along under the surface of the ground, while the only opening made to the surface is by the width of the tube J, and this tube J, being sharp in front, separates the ground easily, and in such manner that it falls back to its place again, immediately behind the tube J, thereby leaving the grain all covered at a uniform depth, and sown broadcast and evenly.

T, fig. 1, represents the tongue, which is pivoted to the cross-piece E by the plates $s$ $s$.

V, fig. 1, represents a rectangular metal device at the centre of the frame-piece D. The tongue passes out through the device V.

W W" represent thumb-screws at the top and bottom of V, by means of which the tongue may be set at different angles, vertically, to the main frame, so as to cause the machine to run level with varying height of horses, &c.

The device V is large enough, vertically, to allow free play of the tongue T.

Having thus described my invention,

What I claim as new, and desire to secure by Letters Patent, is—

1. The shoes X and plates Y, constructed substantially as described, and for the purpose set forth.

2. The tongue T, device V, thumb-screws W, and plates $s$, constructed and arranged substantially as described, and when combined with the frame D, E, C, and F, substantially as described, and for the purpose set forth.

CHARLES RUNDQUIST.

Witnesses:
W. B. RICHARDS,
J. B. HARSH.